United States Patent
Randle

(10) Patent No.: US 11,200,589 B2
(45) Date of Patent: Dec. 14, 2021

(54) MULTI-STAGE GEOLOCATED OFFERS

(71) Applicant: RetailMeNot, Inc., Austin, TX (US)

(72) Inventor: J. Seth Randle, Austin, TX (US)

(73) Assignee: RETAILMENOT, INC., Los Angeles, CA (US)

( * ) Notice: Subject to any disclaimer, the term of this patent is extended or adjusted under 35 U.S.C. 154(b) by 794 days.

(21) Appl. No.: 14/661,403

(22) Filed: Mar. 18, 2015

(65) Prior Publication Data

US 2015/0269600 A1    Sep. 24, 2015

Related U.S. Application Data

(60) Provisional application No. 61/969,119, filed on Mar. 22, 2014.

(51) Int. Cl.
*G06Q 30/02* (2012.01)
*H04W 4/02* (2018.01)
*H04W 4/021* (2018.01)

(52) U.S. Cl.
CPC ......... *G06Q 30/0212* (2013.01); *G06Q 30/02* (2013.01); *G06Q 30/0207* (2013.01); *G06Q 30/0211* (2013.01); *H04W 4/021* (2013.01)

(58) Field of Classification Search
CPC .. G06Q 10/10; G06Q 20/3274; G01S 5/0257; H04W 4/021
USPC ............................. 705/14.26; 455/466, 456.1
See application file for complete search history.

(56) References Cited

U.S. PATENT DOCUMENTS

| 6,826,481 | B2 | 11/2004 | Root et al. |
| 6,980,909 | B2 | 12/2005 | Root et al. |
| 7,979,350 | B1 | 7/2011 | Carion |
| 8,009,619 | B1 | 8/2011 | Clavel et al. |

(Continued)

FOREIGN PATENT DOCUMENTS

| EP | 1626350 A1 | 2/2006 |
| KR | 1020060099489 A | 9/2006 |
| KR | 1020090084139 A | 8/2009 |

OTHER PUBLICATIONS

International Preliminary Report on Patentability for Related PCT Application PCT/US2015/021246, dated Sep. 27, 2016, pp. 1 to 8.

(Continued)

*Primary Examiner* — Saba Dagnew
(74) *Attorney, Agent, or Firm* — Womble Bond Dickinson (US) LLP

(57) ABSTRACT

Provided is a process of managing offers, the process including: obtaining, via a network, with a consumer mobile device, data defining an offer available based on the consumer mobile device being in a first geographic location and redeemable based on the consumer mobile device later being in a second geographic location; sensing, with the consumer mobile device, that the consumer mobile device is in the first geographic location; in response to sensing that that the consumer mobile device is in the first geographic location, presenting an alert with the consumer mobile device, the alert indicating that the offer is available; sensing that the consumer mobile device is in the second geographic location; and in response to sensing that the consumer mobile device is in the second geographic location, determining with a processor of the consumer mobile device that the offer has been redeemed.

17 Claims, 4 Drawing Sheets

(56) References Cited

U.S. PATENT DOCUMENTS

| | | |
|---|---|---|
| 8,060,594 B1 | 11/2011 | Clavel et al. |
| 8,103,865 B2 | 1/2012 | Carion et al. |
| 8,229,467 B2 | 7/2012 | Root et al. |
| 8,271,579 B2 | 9/2012 | Clavel |
| 8,478,245 B2 | 7/2013 | Carion et al. |
| 8,560,601 B2 | 10/2013 | Clavel |
| 8,611,927 B2 | 12/2013 | Root et al. |
| 8,634,814 B2 | 1/2014 | Root et al. |
| 8,732,619 B2 | 5/2014 | Knitowski et al. |
| 8,788,358 B2 | 7/2014 | Knitowski et al. |
| 8,812,024 B2 | 8/2014 | Obermeyer et al. |
| 8,909,679 B2 | 12/2014 | Root et al. |
| 9,015,692 B1 | 4/2015 | Clavel |
| 2005/0277431 A1* | 12/2005 | White ............... H04W 8/04 455/466 |
| 2006/0253481 A1 | 11/2006 | Guido et al. |
| 2007/0185768 A1 | 8/2007 | Vengroff et al. |
| 2008/0139306 A1 | 6/2008 | Lutnick et al. |
| 2008/0274752 A1 | 11/2008 | Houri |
| 2008/0278309 A1 | 11/2008 | Troxler |
| 2009/0170528 A1 | 7/2009 | Bull et al. |
| 2009/0204885 A1 | 8/2009 | Ellsworth et al. |
| 2009/0248548 A1 | 10/2009 | Obermeyer |
| 2009/0307067 A1 | 12/2009 | Obermeyer |
| 2010/0279706 A1 | 11/2010 | Dicke |
| 2011/0226850 A1* | 9/2011 | Ungos ............... G06Q 20/3274 235/375 |
| 2012/0094597 A1* | 4/2012 | Tysowski ............... G06Q 10/10 455/41.1 |
| 2012/0115512 A1 | 5/2012 | Grainger et al. |
| 2012/0122487 A1 | 5/2012 | Holm et al. |
| 2013/0018714 A1 | 1/2013 | George |
| 2013/0041756 A1 | 2/2013 | Carion et al. |
| 2013/0122934 A1 | 5/2013 | Branch et al. |
| 2013/0151645 A1 | 6/2013 | Siliski et al. |
| 2013/0196692 A1* | 8/2013 | Huang ............... G01S 5/0257 455/457 |
| 2013/0275198 A1* | 10/2013 | Zeto, III ............... G06Q 30/02 705/14.26 |
| 2013/0326137 A1 | 12/2013 | Bilange et al. |
| 2013/0332274 A1 | 12/2013 | Faith et al. |
| 2014/0019230 A1 | 1/2014 | Lawson |
| 2014/0337123 A1 | 11/2014 | Nuernberg et al. |
| 2015/0319568 A1* | 11/2015 | Haro ............... H04W 4/029 455/456.1 |
| 2015/0350827 A1* | 12/2015 | Birch ............... H04W 4/021 455/456.1 |

OTHER PUBLICATIONS

International Search Report and Written Opinion for Related PCT Application PCT/US2015/021246, dated Jun. 23, 2015, pp. 1-13.

Supplementary European Search Report for Related EP Application 15768395.4, dated Jul. 31, 2017, pp. 1 to 11.

Notice of Allowance in U.S. Appl. No. 15/074,415 dated Mar. 5, 2020 (14 pages).

Non-Final Office Action in U.S. Appl. No. 16/256,893 dated Mar. 17, 2020 (6 pages).

Office Action in European Application No. 15 768 404.4 dated May 8, 2020 (7 pages).

Garyfalos et al., "Coupons: Wide scale information distribution for wireless ad hoc networks," 2004, IEEE Communications Society, Globecom 2004 (Year: 2004) (5 pages).

Notice of Allowance in related U.S. Appl. No. 16/256,893 dated Jul. 10, 2020 (18 pages).

* cited by examiner

MULTI-STAGE GEOLOCATED OFFERS

CROSS-REFERENCE TO RELATED APPLICATIONS

The present application claims the benefit of U.S. Provisional Patent Application 61/969,119, titled "MULTI-STAGE GEOLOCATED OFFERS," filed 22 Mar. 2014. The entire content of the parent application is hereby incorporated by reference for all purposes.

BACKGROUND

1. Field

The present invention relates generally to electronically distributed coupons and other offers and, more specifically, to multi-stage geolocated offers in which a sequence of geographic locations are associated with an offer.

2. Description of the Related Art

Offer distribution systems are used by merchants (e.g. retailers, service providers, and the like) to convey offers (e.g. coupons, rewards, or sales) to consumers over networks, like the Internet. In some cases, offers may be redeemable in-store, for example, by a consumer printing the offer at home and presenting the printout to a store clerk or by the consumer presenting the offer with a mobile device, like a cell phone, to the merchant. In some cases, offers may be redeemable online, for example, on a merchant's website by a consumer entering an offer-specific code at checkout. Generally, one or more entities operating an offer distribution system obtain data describing the offers from merchants, and the offer distribution system is used to distribute the offers to (in some cases, select) consumers and help consumers find relevant offers. In many cases, merchants compensate entities operating offer distribution systems for such services, for example, based on offer impressions or redemptions by consumers. In one type of offer distribution system, an affiliate network distributes offers to publishers, and the publishers then distribute offers to consumers. In this type of system, the affiliate network typically tracks redemptions of the offers, such that the publishers can be compensated by merchants. In another type of offer distribution system, a single entity obtains the offers from a merchant and distributes those offers to consumers, e.g., using websites or native mobile applications provided by that entity to consumers to access the offer distribution system.

SUMMARY

The following is a non-exhaustive listing of some aspects of the present techniques. These and other aspects are described in the following disclosure.

Some aspects include a process of managing offers, the process including: obtaining, via a network, with a consumer mobile device, data defining an offer available based on the consumer mobile device being in a first geographic location and redeemable based on the consumer mobile device later being in a second geographic location; sensing, with the consumer mobile device, that the consumer mobile device is in the first geographic location; in response to sensing that that the consumer mobile device is in the first geographic location, presenting an alert with the consumer mobile device, the alert indicating that the offer is available; sensing that the consumer mobile device is in the second geographic location; and in response to sensing that the consumer mobile device is in the second geographic location, determining with a processor of the consumer mobile device that the offer has been redeemed.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
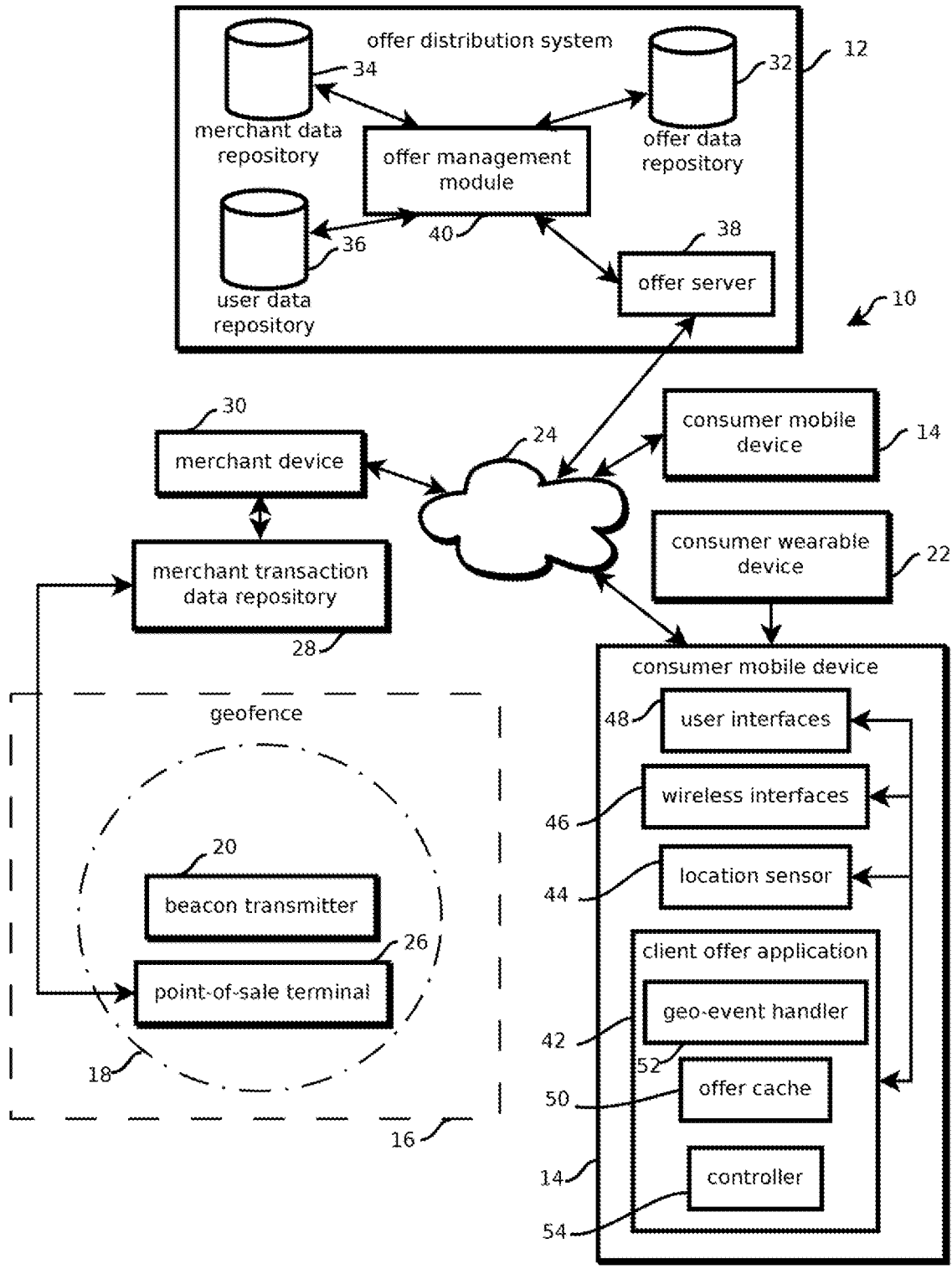
FIG. 1 shows an embodiment of an offer distribution system and consumer mobile devices configured to distribute and track multi-stage geolocated offers.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 is a block diagram showing an example of a distributed computing environment 10, which has components that mitigate various problems with traditional offer distribution systems. One such problem is that it is frequently difficult to appropriately target offers. Many merchants have a limited budget for conferring benefits on consumers with offers. Thus, merchants often wish to target those benefits to consumers who 1) are likely to respond to the offer by purchasing goods or services from the merchant and 2) but-for the offer would not have purchased the goods or services. Otherwise, scarce consumer attention may be wasted on the offer, and margins may be eroded by offering unnecessary discounts.

In accordance with these objectives, applicants have found that the geographic location of consumers relative to a merchant's physical store is useful for targeting consumers. Consumers within a relatively short walking or driving distance to a store (e.g., within a 1,000 square kilometer circular area around the store for driving or within a 1 square kilometer area for walking) are often more likely to respond to an offer by at least visiting the store, if not purchasing goods or services. And consumers already geographically located within a store (or other physical site of a merchant, like a service center) are often already likely to purchase goods or services even without an offer that would otherwise consume some of the merchant's budget for offers. Yet traditional offer distribution systems are generally not well suited for targeting offers based on these observations.

In some embodiments, the computing environment 10 includes an offer distribution system 12 and consumer mobile devices 14 (e.g. cell phones, tablet computers, wearable computing devices, and the like) configured to alert consumers to an offer in response to the consumers being geographically proximate (e.g., within a ten minute drive or walk or within 10-15 kilometers) a merchant's physical location. Further, some embodiments are configured to block consumers already at the merchant's physical location from being alerted to the offer. And some embodiments are configured to automatically (which is not to suggest that other operations described herein are not also performed automatically) reward consumers alerted to the offer for going to the merchant's physical location by sensing the geographic location of the consumers with a respective consumer mobile device 14.

In some applications, a consumer driving by or approaching a mall may be alerted to an offer upon that consumer's mobile device 14 detecting that the consumer is within a first geographic location (e.g., an alert geographic location). An alert geographic location may comprise a geofence 16 and, in some cases, be external to a second geographic location (e.g., a reward geographic location 18) even closer to a merchant's store. The offer, in some cases, includes a reward by which the consumer is entered in a game of chance, such as a sweepstakes, in exchange for physically visiting a merchant's site. Consumer qualification for the reward, such as entry in the game of chance, may be administered, in part, by the consumers mobile device 14 determining that 1) the consumer was previously alerted to the offer, and 2) the consumer mobile device has moved (e.g., is currently) within the reward geographic location 18 specified to qualify for the reward. In some cases, the reward geographic location 18 is defined by a wireless beacon 20 (such as a Low Energy Bluetooth™ beacon defined by a version of the Bluetooth standard including or post stating the Bluetooth Core Specification Version 4.0). The reward geographic location 18 may be sized such that consumers in the reward geographic location 18 are within the store of a merchant issuing the offer, are near the store of a merchant issuing the offer (for instance, within a short walk, like 50 or 100 meters for the reward geographic location 18), or are in a particular department of a merchants store, depending on the marketing objectives of the merchant. Consequently, some embodiments target offers to consumers close enough to be receptive to the offer to visit the store but exclude consumers who likely would visit the store event without the offer. Not all embodiments, however, provide these benefits, as other aspects address other problems in the art and are independently useful. In FIG. 1, the reward geographic location 18 is shown to be within the geofence 16. In other embodiments, the reward geographic location 18 may exist outside of the boundary of the geofence 16. Other embodiments may also include more than one alert geographic location and more than one reward geographic location 18.

In addition to those discussed above, a number of other problems with traditional offer distribution systems are addressed by various aspects of the embodiments described herein:

1) Administering rewards to consumers who have complied with the terms of an offer can be expensive and labor intensive for merchants. For instance, for typical offers, it can be very expensive to have merchant employees manually track which consumers received an offer, track which of those consumers physically visited another geographic location to redeem the offer (e.g., receive, or otherwise qualify for, the above-described reward), and update merchant records to reflect redemption. Indeed, many offers are distributed to tens of thousands of consumers (or more), and thousands of consumers may redeem such offers. Manually verifying that thousands of consumers qualify for a reward for traveling to a targeted geographic location for an offer is expensive, particularly when a merchant has hundreds of stores and dozens of offers issued at a given time.

2) Many marketers are typically vying for the scarce attention of consumers. Indeed, offer distribution systems often host thousands or tens of thousands or more offers, each associated with various geographic constraints and different subject matter. Many traditional offer distribution systems overwhelm consumers with offers that are not particularly relevant to those consumers and fail to facilitate discovery of potentially relevant offers by consumers.

3) Geographically targeting offers according to multiple geographic locations can be difficult because many consumer mobile devices do not have reliable, high-resolution geographic sensing capabilities or data connections. Each additional geographic location associated with an offer increases the likelihood that the consumer will have a bad experience because of a failure to accurately sense geographic location or exchange relevant data with an offer distribution system, particularly when some of the geographic locations relevant to offers are relatively small or are indoors in areas in which many signals used for data transmission and geolocation are attenuated. Accordingly, to the extent offers are associated with geographic locations with traditional systems, in many cases only one geographic location is implicated, and that geographic location may tend to be relatively large.

These and other problems with traditional offer distribution systems are mitigated by aspects of embodiments described below. But it should be appreciated that in some embodiments only a subset of these problems or other problems apparent to those of skill in the art upon reading the present disclosure are addressed. Indeed, as explained in the concluding paragraphs of this specification, the present disclosure includes a number of independently useful inventions that are described in a single document because those inventions are also useful together. Accordingly, any description of a problem or a benefit associated with the present techniques should not be read as defining "the invention" of the present application, as the present application relates to several inventions, some of which are defined in the originally filed claims, and others that may be addressed in later claim amendments or continuation applications.

In some embodiments, the computing environment 10 includes the offer distribution system 12, consumer mobile devices 14, a consumer wearable device 22, the Internet 24, a point-of-sale terminal 26, a merchant transaction data repository 28, and a merchant computing device 30. The offer distribution system 12, in some embodiments, may manage (e.g., store, distribute, and track) offers created by a merchant, e.g., with merchant device 30. These components are described in greater detail below after a brief overview of a use case.

In some applications, the offers may be distributed to consumer mobile devices in response to those consumer mobile devices determining that the respective devices are within the geographic location 16 or the surrounding area. In some cases, the offers may be redeemed based on the consumer mobile devices 14 determining that the respective devices are within the other geographic location 18, which may be specified in the offer as the place where the offer is redeemed (e.g., the consumers sole obligation to redeem the offer may be to travel to location 18, or the consumer may have to take other steps). The consumer mobile devices 14 may report travel to location 18 to the offer distribution system 12 for centralized tracking In some cases, consumers enticed to visit at store at location 18 may purchase goods or services with the point-of-sale terminal 26, and the entity operating the offer distribution system 12 may be compensated based on records of those purchases stored in the merchant transaction data repository 28. The various components of the computing environment 10 may be geographically distributed and may communicate with one another remotely via the Internet 24 and various other networks, such as cellular networks, wireless area networks, local area networks, and the like.

In some embodiments, the offer distribution system 12 includes an offer data repository 32, a merchant data repository 34, user data repository 36, an offer server 38, and an offer management module 40. The offer data repository 32 may store offer records describing offers, the merchant data repository 34 may store merchant records describing merchants, the user data repository 36 may store user profiles, the offer server may send data about offers over the Internet 24 and receive data about offers, and the offer management module 40 may coordinate the operation of these other components to provide the functionality described herein.

In some cases, the offer distribution system 12 manages offers for hundreds of merchants issuing tens of thousands or hundreds of thousands of offers to relatively large geographic areas, such as the United States or a substantial portion of the world, and those offers are distributed to tens of millions for hundreds of millions of consumer mobile devices. Accordingly, some embodiments of the offer distribution system 12 may include computing components that are replicated and use load-balancing servers to reduce latency and operate at such scales. Applicants expect that consumers generally desire to interact with offers selected from a relatively large pool of offers to see offers that are relatively likely to be relevant to those consumers, and merchants generally desire to distribute their offers to a relatively large number of consumers. At the same time, applicants expect that such consumers are often relatively sensitive to latency when interacting with such offers. Accordingly, to facilitate both scale and speed, some embodiments may be constructed in a data center, and content may be hosted by content delivery networks to expedite delivery of bandwidth intensive content, such as images or video. Further, records in the various data repositories may be replicated in various indexed data structures, such as hash tables, sorted list, prefix trees, and the like that are pre-processed to facilitate relatively fast retrieval of records based on multiple, frequently-used query values.

In some embodiments, the offer-data repository 32 includes a plurality of offer records, each offer record describing an offer, such as a coupon, sale, conditions for entry to a game of chance, conditions to receive some other benefit, or the like. Each offer record may include a unique offer identifier, a summary of the offer, a more detailed description of the terms of the offer, a identifier of a merchant issuing the offer, an expiration time for the offer, content for presenting the offer (e.g., images, like video, illustrating the good or service subject to the offer), and a category or subcategories of the offer (e.g. restaurants, sporting goods, retail clothing, and various other hierarchical categories in an offer ontology).

Some of the offer records may describe multi-stage geolocated offers, which specify a sequence of geographic locations in which a consumer mobile device travels in order for a respective consumer to be presented with (or otherwise alerted to) the offer and to redeem the offer. Redeeming the offer may include determining that the consumer qualifies for a reward. Examples of rewards include automatically entering the consumer in a game of chance, such as a sweepstakes, determining whether the consumer is an instant winner in a game (e.g., determining within less than 10 or 20 minutes whether the person is a winner, such that the desired consumer activity is relatively tightly coupled with a reward), such as an a contest to be the 50th person to visit the store; presenting the consumer with another offer, which may be another multi-stage geolocated offer. In some cases, a plurality of multi-stage geolocated offers may be linked to one another by making one (or more) offer(s) the reward for a preceding offer. This data structure may be used to entice consumers through a sequence of geographic locations, for instance, in a promotional scavenger hunt, or through a series of stores or departments having complementary goods.

Offer records for multi-stage geolocated offers may include an alert geographic location defining a geographic location where a consumer is to be alerted to the offer, a reward geographic location defining a different geographic location where a consumer is to be rewarded, and a description of the reward geographic location that is human readable (e.g. prose explaining that the consumer will receive the reward in exchange for visiting store X in mall Y). Geographic locations may be described with a value indicating the type of geographic location description. An example description is a geofence, with which the geographic location is described with reference to an absolute geographic reference, like geographic coordinates, for instance, latitude and longitude coordinates defining vertices of a polygon specifying the geographic location, or latitude and longitude coordinates for a vector graphics representation of the geographic location (e.g., a center point coordinate and a radius). Another example description is a wireless transmission range in which the geographic area is defined by the range over which a wireless signal is discernible, such as the range over which a consumer mobile device can discern an identifier encoded in a Low Energy Bluetooth Beacon, a Bluetooth Beacon, a Wi-Fi Beacon, or the like. In some cases, the signal is deemed discernible if a value encoded in the wireless signal is received by a consumer mobile device, such as a value uniquely identifying the transmitter (or the merchant, or the merchant's site) that corresponds to the geographic location, like a beacon identifier or an SSID value selected with reference to a namespace that distinguishes other transmitters and other locations. Another example of wireless transmission includes such values being encoded in audio signals in a merchant's on-site music (which may be detected by a consumer mobile device's microphone) or such values being encoded in a merchant's overhead lighting (which may be detected by a light sensor on a consumer mobile device). These wirelessly encoded identifiers may be stored in the offer record in association with the geographic location, such that consumer mobile devices may be sent the identifier and detect transmission of the identifier to determine that the consumer mobile device is at a geographic location.

In some cases, the description, type and size of geographic locations are selected based on the desired type of consumer interaction at the respective stage of the multi-stage geolocated offer. In some embodiments, geofences are used for outdoor or geographic areas larger than approximately 10,000 m² due to the relatively low resolution and reliability of signals by which geographic coordinates of a mobile devices current geographic location are determined by mobile devices. In some cases, wireless transmission ranges are used for an indoor or geographic areas smaller than approximately 10,000 m² due to their higher reliability offsetting the higher cost of providing such signals in these cases. In some examples, a wireless transmission range may be configured such that the corresponding geographic location is larger than approximately 100 m² to make it relatively easy for consumers to find the respective geographic location, for instance, by walking into the interior of an identified store or passing through a door of an identified store. In another example, the wireless transmission range may be on the order of approximately 1 meter or less, for example, based on near field communication (NFC) transmissions, and consumers may be directed to a relatively specific location, for instance, a particular shelf in a store. Because of the distinct use cases, some embodiments may use a different description type for NFC and similar transmission ranges, referring to these geolocation descriptions as point geolocations. In some cases, point geographic locations are distinct from the point-of-sale terminal 26, such that the consumer is directed to merchandise or services that the merchant wishes to sell, rather than to a checkout counter where the consumer would not necessarily be exposed to such merchandise or services.

In some cases, some or all of the offers (including the multi-stage geolocated offers) are single-use offers for which each instance of the offer is separately tracked by the offer distribution system 12 and is redeemable a limited number of times (e.g., once), in contrast with multi-use offers in which the same information (e.g., an offer code) may be used by a relatively large number of consumers, and the number of consumers in possession of the offer is not necessarily known (e.g., due to email sharing, photocopying, and the like). For single-use offers, each offer record may include an amount (e.g., a number) of instances of the offer to be redeemed, to be reserved (as some merchants wish to avoid disappointing consumers who believe they have a valid offer only to arrive at a store and find that all permitted redemptions have occurred), or both. Further, for single-use offers, each offer record may include a plurality of offer instance records, each instance record including an offer instance identifier, a value indicating whether the offer instance has been reserved, a value indicating whether the offer instance has been redeemed, an identifier of a user who has redeemed the offer instance if available, and an identifier of a user who has reserved the offer instance if available. For some multi-stage geolocated offers, offer instances may be reserved by simply being in the alert geographic area. In other cases, the consumer may be asked to take further affirmative steps, such as interacting with an interface on the consumer mobile device 14 to cause the mobile device to indicate to the offer distribution system 12 that the consumer wishes to reserve an offer instance. Thus, the value indicating whether the offer instance has been reserved may be used to determine whether a consumer who later enters the reward geographic area qualifies for the reward, or some embodiments may perform this determination based on client-side offer state data stored in consumer mobile devices, such as a value indicating that the consumer mobile device was previously in the alert geographic location.

The merchant data repository, in some embodiments, may include a plurality of merchant records, each merchant record describing an individual merchant. Each merchant record may include a name of the merchant, a unique identifier of the merchant, content used to present offers from the merchant (e.g., images, like the merchant's logo), roles and permissions defining (a term which is used here interchangeably with the term "specifying") which merchant employees are permitted to control (e.g., create, change, and track) offers, templates for creating offers (e.g., preconfigured geographic locations from which the offer creator might select), and a plurality of store records, each store record describing a geographic location one of the merchant's stores, such that offers may be selected for presentation to consumers based on a consumer's proximity to a store by the offer distribution system 12.

The user data repository 36, in some embodiments, may include a plurality of user profiles. Each user profile may include a username, a password, a unique user identifier, demographic information about the user (e.g., a residential address, an occupation type, interests, and the like), and interaction records describing previous interactions by the user with the offer distribution system 12. In some cases, the multi-stage geolocated offers may be selected for presentation to a consumer by the offer distribution system 12 based both on the consumer's location and the consumer's user profile satisfying criteria relating to the demographic information or a pattern in the interaction records. For example, a merchant may specify, when defining an offer, that consumers scoring above a threshold on a metric indicative of affinity for sports may be alerted to a multi-stage geolocated offer in response to those consumers entering a geofence. Or two candidate multi-stage geofenced offers may be ranked by the offer distribution system 12 based on similarities between those offers and previous offers the consumer has redeemed, and the offer more similar to previously redeemed offers may be sent to the consumer based on the ranking.

The offer server 38 may interface between the offer management module 40 and the Internet 24. For example, the offer server 38 may listen to a port through which information is exchanged with the other components of the computing environment 10 and translate signals (e.g., data, like commands or content) into a format to which the offer management module 40 is responsive or from a format in which such signals are supplied by the offer management module 40. In some cases, the offer server 38 may parse received hypertext transport protocol (HTTP) requests (or other application layer protocol exchanges, like SPDY) to identifying corresponding functions of the offer management module 40 and call the corresponding functions of the offer management module 40 with data encoded in the HTTP requests as function parameters. In some cases, the offer server 38 includes a web server, an application program interface server, or both.

The offer management module 40 may perform a process described below with reference to FIG. 2 and interact with the other components of the offer distribution system 12 to provide the functionality described herein. For instance, the offer management module 40 may receive requests for offers from the consumer mobile devices 14, query the offer data repository, and return responsive offers via the offer server

38. In some cases, such requests indicate a current geographic location of the respective requesting consumer mobile device 14 as sensed based on the current wireless environment of the consumer mobile device 14, for instance, including an identifier conveyed with a wireless beacon or a geolocation sensed based on satellite navigation signals received by the consumer mobile device 14. In some cases, the offer management module 40 may retrieve geolocated offers (e.g., offers associated with a geographic location in which consumers are to be alerted to the offer based on location sensed with a cell phone) based on the location in such a query. As noted above, offers may be ranked for presentation in response to such a query based on previous user actions stored in the user data repository 36 as well as geographic proximity. Further, some embodiments may score offers based on an expected return to the entity operating the offer distribution system calculated according to the user profile, a merchant profile, and attributes of the offers, like an amount of a discount, redemption rates for the offer, or a category of the offer.

Some embodiments of the offer management module 40 may send offers corresponding to both the current geographic location of the consumer mobile device and the surrounding area, such that nearby geolocated offers (e.g., offers not presently relevant, but potentially relevant should the consumer move) may be stored in cache memory of the consumer mobile device 14. Cached offers may be recalled from memory by the consumer mobile device 14, for instance, in the event that the consumer mobile device 14 moves into a relevant geographic area and lacks adequate signal strength to communicate with the offer distribution system 12. Caching both currently relevant and potentially relevant geolocated offers is expected to further offer benefits relating to battery consumption of the consumer mobile devices 14, as fewer interactions with the offer distribution system may be used to convey information. That said, not all embodiments use this caching technique, as other aspects are independently useful, which is not to suggest that any other feature is not also optional in some embodiments.

In some cases, the offer management module 40 may update records in the offer data repository 32 and interaction records in the user data repository 36 to reflect interactions with offers. For example, upon a consumer being sent an offer, both records may be updated, and upon a consumer redeeming the offer or taking affirmative steps to reserve the offer, both records may be updated by the offer management module 40 based on corresponding signals indicative of such interactions sent by the consumer mobile device 14, merchant device 30, or POS terminal 26, depending on the activity and configuration.

In some cases, before sending instructions to present an alert, embodiments of the offer management module 40 may compare a threshold amount of instances of an offer to be reserved or redeemed (e.g., as specified by a merchant) to a current amount of instances of an offer that have been reserved or redeemed. In response to determining that the amount exceeds the threshold, embodiments may determine that the offer is not to be sent. And in response to determining that the amount does not exceed the threshold, embodiments may determine that the offer may be sent and adjust the current amount (e.g., increment or decrement a count).

In some embodiments, the offer management module 40 may receive data from one of the consumer mobile devices 14 indicating that the consumer mobile device 14 has moved to the reward geographic location and, in response, determine that the respective consumer qualifies for the reward of a corresponding multi-stage geolocated offer. In response to such a determination, the user data repository 36 may be updated by the offer management module 40 to reflect the user interaction, and a corresponding offer instance record in the offer data repository 32 may be updated by the offer management module 40 to indicate that the offer has been redeemed. In some cases, the offer management module 40 may fully administer the reward in the course of designating the offer instance as being redeemed, for example, by adding an identifier of the respective consumer (e.g., corresponding to a record in the user data repository) to a list of identifiers stored in memory for consumers qualified for a reward. Some embodiments may implement a game of chance by randomly (e.g., pseudorandomly by accessing a random number generator of a computing device) selecting a user identifier from such a list, for example, in a sweepstakes in which the users are automatically entered after receiving the offer and proceeding to the reward geographic location. In another example, a count of a number of users who have received the offer and traveled to the reward geographic location may be incremented, and the offer management module 40 may determine whether the count equals a value that qualifies the consumer for a prize (a chance at the prize being the reward a qualified consumer redeems by visiting the appropriate place), for instance, a reward in which the nth consumer to visit the store in accordance with the offer receives a discount. Winners of games of chance and other contests may be alerted to their win by the offer distribution system 12 sending instructions to the corresponding consumer mobile device 14 to display an indication of their result and, in some cases, information that when presented to a merchant validates that they won. Or some embodiments may credit an account of the winning consumer, e.g., adding credit to a store loyalty card or an electronic wallet, or adding an offer for winners to a card-linked offer account or electronic wallet. In other embodiments, the offer distribution system 12 may send instructions to the corresponding consumer mobile device 14 to display an offer redeemable by the merchant at the reward geographic location.

In another example, the reward may be another multi-stage geolocated offer, and the corresponding offer may be retrieved from the offer data repository 32 by the offer management module 40. In this example, a new alert describing the new multi-stage geolocated offer may be sent to the corresponding consumer mobile device 14 that qualified for the previous multi-stage geolocated offer. Stringing together a sequence of multi-stage geolocated offers may be useful for merchants that wish to direct consumers through a sequence of stores or departments having complementary goods or services or engage consumers with a scavenger hunt or the like.

Automatically administering such rewards with the offer management module 40 (e.g., determining who qualifies, alerting qualifiers through their mobile device, and in some cases, determining who wins a game of chance or other contest) is expected to lower the cost of incentivizing desired consumer behavior relative to traditional techniques in which such programs are manually administered. That said, not all embodiments provide these benefits, as other aspects are independently useful, which is not to suggest that any other feature described herein is not also optional in some embodiments.

The data indicating that the consumer mobile device 14 has moved into a geographic location (either an alert geographic location or a reward geographic location) may come from the consumer mobile device itself (as described below) or from another device, such as a beacon sensor at a merchant store sensing the consumer mobile device is transmitting such an indication to the offer distribution system 12, depending on the embodiment. In some cases, a client offer application described below causes the consumer mobile device to transmit a beacon (such as a Low Energy Bluetooth beacon, or other wireless signal, like a signal in a near field communication transmission), and a computing device operated by the merchant detects the wireless signal and sends an indication to the offer distribution system 12. In some cases, the wireless signal includes an identifier of the consumer mobile device or an identifier of the consumer corresponding to a user profile, and this identifier is sent by the merchant computing device to the offer distribution system 12 indicating that the consumer is at the specified geographic location.

Rewards may be conveyed by the offer management module 40 with a variety of techniques. For example, the respective consumer mobile device 14 may be texted, emailed, or otherwise sent instructions (e.g., commands or other data that when processed causes a corresponding activity to occur) to display an alert indicating a URI from which the consumer may retrieve proof that the consumer qualifies for the reward (or in the event that the consumer won a contest, proof that the consumer won). For example, the consumer may be sent a URI with which the consumer may retrieve a code that when presented to a merchant validates that the consumer is entitled to the reward. In one example, the offer management module 40 may send the respective consumer mobile device 14 an image of a validation code in a one-dimensional visual code (e.g., a bar code or a flashing screen) or a two-dimensional visual code (e.g., a QR code) format, and an optical scanner or mobile device operated by a merchant employee may scan the code from a display screen of the consumer mobile device with an image sensor, like a camera. In some cases, the point-of-sale terminal 26 or a merchant employee mobile device may send an indication that the validation code has been scanned or otherwise entered or presented to the offer distribution system 12, and the offer distribution system 12 may determine whether the validation code is valid (e.g., corresponds to a validation code in memory previously sent to a qualified consumer and has not been previously validated) and respond with a signal indicating whether the validation code is valid. Further, the offer management module 40 may update a record of an offer instance in which such a code is stored to indicate that the reward has been claimed, so that the offer management module 40 may determine that subsequent request to validate the same validation code are to be rejected. In another example, rewards may be conveyed to an electronic wallet account associated with a user profile of the consumer or a card-linked offer account associated with a profile of the user, and the consumer may claim the reward by accessing their electronic wallet account with their mobile device or presenting the appropriate card to a merchant.

In some cases, the entity operating the offer distribution system 12 may be compensated by a merchant for various activities that may be tracked in the computing environment 10. For instance, the entity may be compensated for consumers being presented with alerts, consumers reserving offers, consumers traveling to the reward geographic location, consumers claiming their reward, or consumer purchases after one or more of these events (e.g., within some threshold duration of time corresponding to a typical single visit to a merchant's physical site, such as within the next six hours following one of these events). Accordingly, the consumer mobile device 14 and the merchant device 30 may send signals to the offer distribution system 12 indicating when such events occur and providing data by which compensation may be determined, such as transaction data indicating what a consumer purchased and a validation code presented by the consumer to claim the reward. Traditional offer distribution systems often suffer from what is referred to as "breakage" when sales clerks fail to credit the entity operating the offer distribution system 12 for sales driven by that entity. Tying transaction records to a value presented when claiming a reward and associated with a user profile is expected to reduce breakage. That said, not all embodiments necessarily provide this benefit, as the other aspects described herein are independently useful, which is not to suggest that any other feature described herein may not be omitted in some embodiments.

The consumer mobile devices 14 may be cell phones, tablet computers, or other computing devices having a portable source of power and that are typically with a consumer when away from their home and work. Two consumer mobile devices 14 are illustrated by way of example, but as noted above, embodiments are consistent with substantially more, for example, more than ten-million consumer mobile devices distributed over a relatively large geographic area, such as North America and Europe. In some embodiments, consumer mobile devices 14 may each execute a client offer application 42 configured to cooperate with the offer distribution system 12 to manage multi-stage geolocated offers. Various resources of the consumer mobile device 14, including a location sensor 44, wireless interfaces 46, and user interfaces 48 may be accessed by the client offer application 42 via the operating system of consumer mobile devices 14 to effectuate operations described herein. The location sensor 44 may include a global positioning system (or other satellite navigation system, like GLONASS) sensor operative to determine a current latitude and longitude of the consumer mobile device 14 based on satellite navigation system signals. In some cases, the location sensor 44 also or alternatively uses identifiers of cell towers in range or other wirelessly transmitted identifiers, such as SSID identifiers of wireless area networks. In some cases, the consumer mobile device 14 may determine location by sensing such wireless signals and sending a request to a third-party service to ascertain the location based on characteristics (e.g., a "fingerprint") of the current wireless environment). In some cases, such as for some indoor applications, these wireless signals by be combined with signals captured by a magnetometer of the mobile device to determine geolocation, e.g., by sensing the magnetic landscape produced by interaction between a building and the Earth's magnetic field (e.g., according to geolocation services from IndoorAtlas of Mountain View Calif.). In some cases, the mobile device further includes a magnetometer by which the wireless landscape of space may be sensed, e.g., by fusing data from the magnetometer with accelerometer data and wireless signals sensed by the mobile device to profile changes in magnetic fields over space (like an in-door space where other techniques may be less accurate in some cases) and match those profiles with known profiles indicative of geolocation. The wireless interfaces 46 may include Bluetooth, NFC, cellular, and Wi-Fi wireless interfaces among others, through which the various signals noted herein may be exchanged. The user interfaces 48 may include a display screen of the consumer mobile device 14 upon which alerts are displayed and various interfaces for reserving offers and claiming rewards are displayed. User interfaces 48 may further include a haptic interface by which, for example, the consumer mobile device 14 may be caused to vibrate when an alert is received, and a speaker that may be caused to emit sound when an alert is received.

In some embodiments, the client offer application includes an offer cache 50, a geo-event handler 52, and a controller 54. These components may communicate with one another and the various resources 44, 46, and 48 to manage multi-stage geolocated offers. In some cases, controller 54 may instruct the location sensor 44 to generate a geolocation event when (e.g., in response to the following) the consumer mobile device 14 moves more than a threshold amount, for example, more than a threshold distance, or from one area to another, such as from one cell tower to another. In response to such an event, the geo-event handler 52 may signal the controller 54 to execute a routine by which geolocated offers are requested from the offer distribution system 12. The request may include an identifier of the current geographic location, and the offer distribution system 12 may respond with a plurality of multi-stage geolocated offers. In some cases, responsive offers may include offers in a surrounding geographic area, some of which specify geographic locations in which the consumer mobile device 14 is not presently residing. The surrounding offers may be stored in the offer cache 50 for reference in the event that the consumer mobile device 14 moves into areas in which these surrounding multi-staged geo-located offers are relevant. Caching a group of offers corresponding to a surrounding area with a single request is expected to reduce battery consumption of the consumer mobile device 14 and render the client offer application 42 more resilient to interruptions in communication with the offer distribution system 12. For example, some embodiments of the client offer application 42 may determine whether the consumer mobile device location sensor 44 indicates the consumer mobile device is in a cached geolocation, and in response, present the appropriate alert or indicate that the corresponding reward is available, even in the absence of communication with the offer distribution system 12. Later, upon communication being reestablished, a buffer storing corresponding updates for the offer distribution system 12 may be accessed, and the stored data may be transmitted to the offer distribution system 12 to synchronize the state of the multi-stage geolocated offers between the offer distribution system 12 and the client consumer mobile device 14.

The controller 54 may periodically (or intermittently in response to some external stimulus, like a change in the current wireless environment) determine whether the current geographic location sensed by the location sensor 44 or wireless signals received by the wireless interfaces 46 corresponds to any multi-stage geolocated offers. For instance, upon determining that the current latitude and longitude of the consumer mobile device 14 is within a responsive geofence, or a wireless identifier received by the wireless interfaces 46 corresponds to a wireless range geolocation, the controller 54 may update the record of the corresponding multi-stage geolocated offer in the offer cache 50 and send instructions to the offer distribution system 12 to do the same (or add such an instruction to a buffer of data to be sent when a data connection is restored). For example, the controller 54 may periodically poll a Bluetooth interface for identifiers of Bluetooth beacons within range and query multi-stage geolocated offers in the offer cache 50 for alert geographic locations or reward geographic locations corresponding to the identifiers. And the controller 54 may periodically poll the location sensor 44 for a current latitude and longitude and determine whether the current latitude and longitude is within any geofences identified in the offer cache 50. In some cases, embodiments may use a ray-casting algorithm or a winding number algorithm to determine whether a current location is within a geofence.

In some cases, alerts may be presented by the controller 54 requesting the operating system to present an alert using an application program interface of the operating system, such that alerts are presented on a lock screen of the consumer mobile device 14 or on a header area of the home screen of the consumer mobile device where consumers typically expect to view such alerts. In some cases, rewards may be similarly indicated to the consumer, or the consumer may be presented with a full-screen display describing the reward.

Some embodiments provide the consumer a multi-screen experience in which the state of multi-stage geolocated offers is consistent across multiple devices and multiple consumer devices perform different portions of the client-side functionality described herein. For example, an in-dash automotive computer may correspond to one of the consumer mobile devices 14, and a cell phone may correspond to another one of the mobile devices 14. In this use case, the in-dash computer may determine that the consumer is in an alert geographic location, and the cell phone of that same consumer may determine that the consumer is later in the reward geographic location. To this end, cached offers may be updated by the offer management module 40 on each consumer mobile device executing a client offer application associated with a given user profile, such that a given consumer has a consistent experience across multiple devices. In another example, the consumer mobile device 14 may be a cell phone that causes a consumer wearable device 22 to display information about offers via a personal area network, such as via a Bluetooth network. In some cases, the consumer wearable device 22 is a smart watch or head-mounted display coupled with the consumer mobile device 14 via Bluetooth connection, and alerts may be displayed on the consumer wearable device 22, indicating that the consumer may receive the reward by moving to the reward geographic location or that the consumer has received the award by being in the reward geographic location. In some cases, as noted above, the location of the consumer may be determined based on the consumer device transmitting a beacon, in which case the beacon may be transmitted by the consumer wearable device 22 or the consumer mobile device 14, which is not to imply that consumer wearable devices are not a type of consumer mobile device.

FIG. 1 illustrates two types of geographic locations, a geofence 16 (defined by geographic coordinates, for purposes of this application) and a wireless range 18 (defined in this example by the wireless range of a beacon transmitter 20). In other embodiments, other arrangements may be used to specify geolocation, depending upon a merchant's goals. For example, both of the geographic locations may be geofences or both of the geographic locations may be of the wireless range type. In one example, a mall is ringed with a plurality of beacon transmitters in spaced relation, such that consumers crossing a perimeter defined by the wireless range of these transmitters may be presented with an alert relating to a given store within that mall. In the illustrated example, the alert geographic location is a geofence 16 and the reward geographic location is a wireless range 18, but those roles may be reversed, again depending upon the merchant's objectives. In some cases, the reward geographic location may be smaller than and inside of the alert geographic location, such that consumers likely to be interested in an offer are presented with the multi-stage geolocation offer, and those consumers are rewarded for moving closer to (e.g., traveling to) a merchant's store, for example.

In some cases, the alert geographic location may be defined, in part, by a negative space within the alert geographic location. The negative space may be a contained geographic location (e.g., in interior concentric circle of the alert geographic location) in which consumers are not alerted to a multi-stage geolocated offer. Some merchants may wish to avoid sending such alerts to consumers likely already on their way to a given merchant's physical site without the added enticement of an offer. The negative space may be defined by either the geofence or a wireless range type geographic location, in some cases, the wireless range geographic location defining the reward geographic location.

In some embodiments, the reward geographic location is not within the alert geographic location. For example, a merchant operating a sporting goods store may wish to drive consumers at a sporting event to their store, and the alert geographic location may correspond to the location of the event, while the reward geographic location corresponds to the store. This configuration may also be used in embodiments in which a sequence of multi-stage geolocated offers are strung together to drive the consumer through a desired path. In another example, multiple alert geographic locations may be established that may or may not be external to the reward geographic location. Each alert geographic location may, for example, encompass a separate entrance or exit area of a shopping mall or subway station and the reward geographic location may include a portion of a merchant store with the shopping mall or subway station.

In some embodiments, the merchants store or other physical site includes a point-of-sale terminal 26 operable to record transactions in, and retrieve data from, a merchant transaction data repository 28. In some cases, as noted above, upon receiving a reward, consumers may be sent information that when presented to a merchant sales clerk, may be used by the merchant sales clerk to provide a benefit specified by the reward when the consumer claims the reward (e.g., a validation code unique to that consumer). Accordingly, in some embodiments, after a consumer qualifies for a reward, the offer management module 40 may generate a unique reward validation code and store the unique reward validation code in the corresponding offer instance record. Reward validation codes may be validated with a number of techniques, including the techniques described above by which the reward validation code is sent to the offer management module 40, which may respond with an indication of whether the code is valid. In some cases, the offer management module 40 may retrieve an authorization code corresponding to the merchant's point-of-sale terminal 26 from the merchant data repository 34, and that code may be sent for entry into the point-of-sale terminal 26 to authorize conveyance of the corresponding benefit. In another example, the unique reward validation code may also be sent to the consumer mobile device 14, such that when the unique reward validation code is presented by the consumer and entered into the point-of-sale terminal 26, that code may be recognized in the merchant transaction data repository 26 as a valid code and the appropriate reward may be recorded in the course of conveyance of the benefit.

The merchant transaction data repository 28 may store data about consumer transactions with the merchant, including timestamps for transactions, inventories of items or services purchased, prices for purchases, and the like. In some cases, validation codes (which may identify the offer distribution system 12, or other such identifying values) are also stored, such that the merchant can calculate the appropriate amount of compensation for the entity operating the offer distribution system 12 for directing consumers to the merchant's physical site. Or in some cases, the entity may be compensated based on some other metric, such as an amount of foot traffic directed into a store.

Merchant device 30 represents one or more computing devices of the merchant or merchant employees that may be used to create new multi-stage geolocated offers. In some cases, merchant employees may log into a web-based interface hosted by the offer distribution system 12 and design geolocation offers according to template stored in the merchant data repository 34. In some cases, merchant employees authenticate themselves using usernames and passwords indicating that the employee is entitled to create offers on behalf of the merchant. In another example, merchant employees may direct the entity operating the offers discovered distribution system 12 to create such offers. As noted above, in some embodiments, the merchant device 30 may be a merchant employee mobile device used to scan a visual display of a reward validation code and send a request to the offer distribution system 12 to validate the reward validation code. Thus, the merchant device 30 may be used to determine whether a consumer is presenting a valid reward validation code or one that is fake or has already been claimed.

Figure 2:
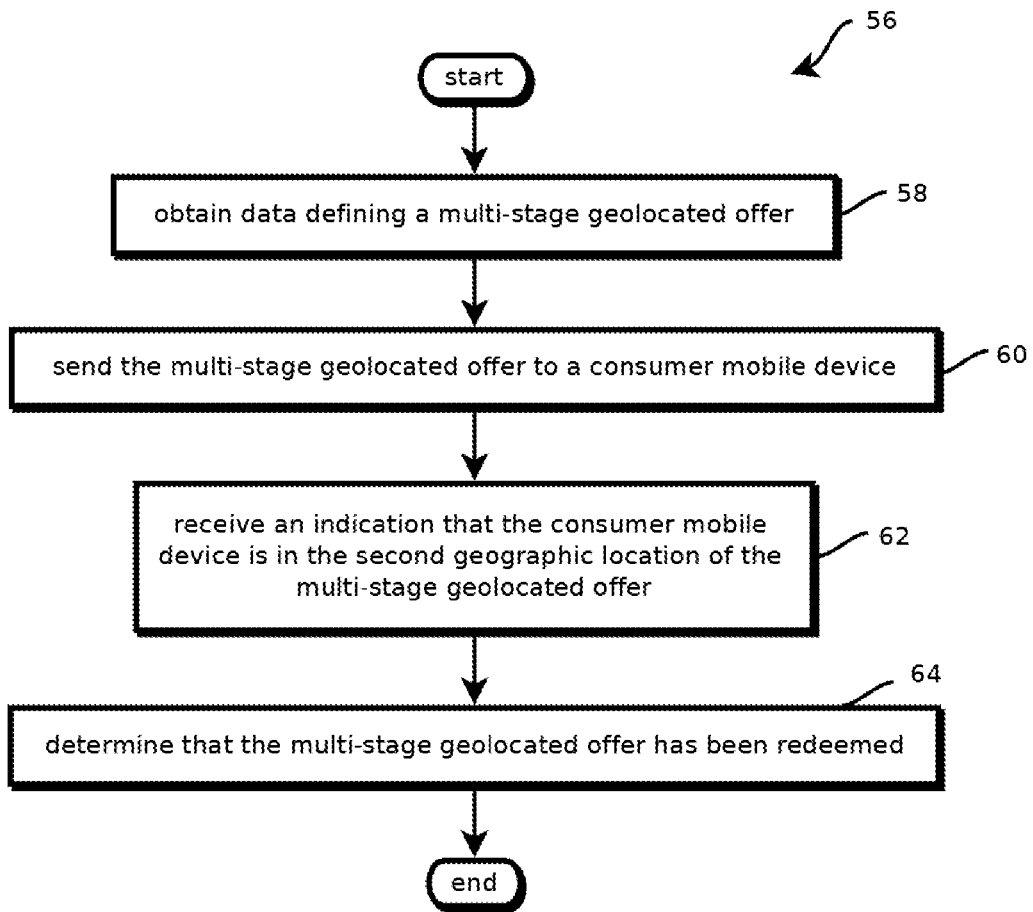
FIG. 2 shows an embodiment of a process for distributing and tracking multi-stage geolocated offers that may be performed by some embodiments of the offer distribution system of FIG. 1.

FIG. 2 shows an embodiment of a process 56 for distributing multi-stage geolocated offers. The process 56 may be performed by some embodiments of the above-described offer distribution system 12, but is not limited to such implementations. In this example, the process 56 begins with obtaining data defining a multi-stage geolocated offer, as indicated by block 58. Next, the multi-stage geolocated offer may be sent to a consumer mobile device, as indicated by block 60. Embodiments may further receive an indication that the consumer mobile device is in the second geographic location of the multistage geolocation offer, as indicated by block 62. In some cases, embodiments determine that the multi-stage geolocated offer has been redeemed based on receiving this indication, as indicated by block 64.

Figure 3:
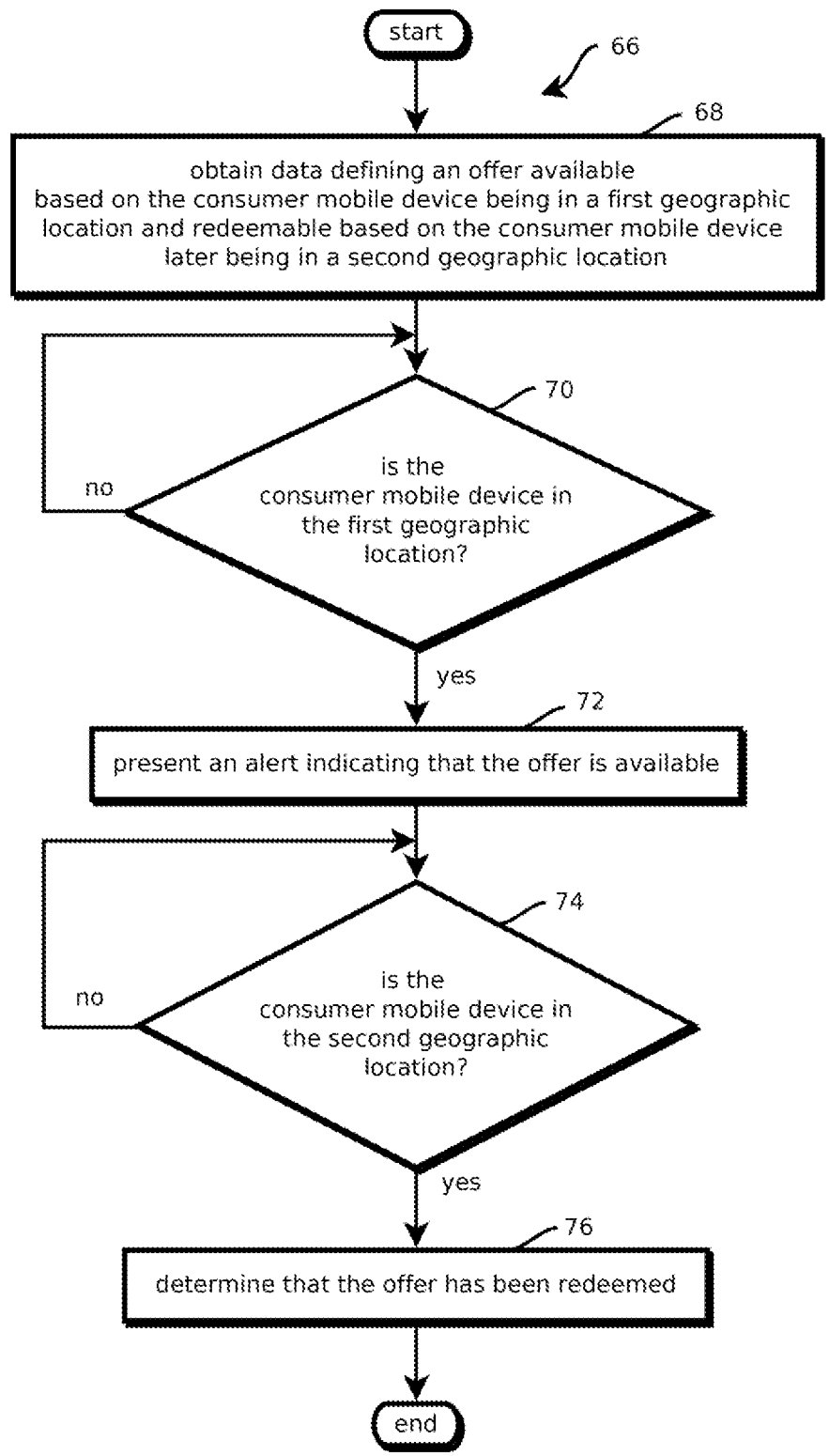
FIG. 3 shows an embodiment of a process for presenting and redeeming multi-stage geolocated offers based on a sequence of geographic locations sensed by a consumer mobile device, such as the consumer mobile devices of FIG. 1.

FIG. 3 shows an embodiment of a process 66 for presenting and redeeming multi-stage geolocated offers. In some embodiments, the process 66 is performed by the above-described client offer application 42 of FIG. 1, but is not limited to those implementations. In this embodiment, the process 66 includes obtaining data defining an offer available based on the consumer mobile device being in a first geographic location and redeemable based on the consumer mobile device later being a second geographic location, as indicated by block 68. Next, embodiments may determine whether the consumer mobile device is in the first geographic location, as indicated by block 70. In some cases, a consumer mobile device may be determined to be in a geographic location in response to the consumer mobile device crossing a geofence, or embodiments may make this determination in response to the consumer mobile device being determined to currently be positioned within a geographic location (which is not to suggest that geofence traversal into the geofence is distinct from being in the geofence, i.e., within the geofence, or at the corresponding geographic location). Upon determining that the consumer mobile device is not in the first geographic location, embodiments may continue to wait until the consumer mobile device is in the first geographic location. Upon determining that the consumer mobile device is in the first geographic location, embodiments may present an alert indicating that the offer is available, as indicated by block 72. In some cases, the alert may indicate to the consumer that the consumer will receive a reward in exchange for the consumer traveling to the second geographic location. Some embodiments may include content with a map illustrating the second geographic location to assist consumers or request a mapping application on the consumer mobile device to display the second geographic location. Next, embodiments may determine whether the consumer mobile device is in the second geographic location, as indicated by block 74. If the consumer mobile device is not in the second geographic location, embodiments may continue to wait until it is. In some cases, offers may be associated with an expiration time, and embodiments may include a step in which the process 66 is terminated in response to determining that the current time is after the expiration time. Upon determining that the consumer mobile device is in the second geographic location, embodiments may determine that the offer has been redeemed, as indicated by block 76. Redeeming the offer may include determining that the consumer is entitled to a reward as described above, which may include entering a game of chance, a cash reward, another offer, or the like.

Thus, some embodiments may facilitate management of multi-stage geolocated offers. Further, some embodiments may do so in a way that is amenable to operating at the scales frequently presented in commercial offer distribution systems and with the speed and low latency expected by consumers using such systems. Moreover, some embodiments may implement such offers in a battery-friendly way, and in a manner that is resilient to loss of data signals, such that consumer experiences with multi-stage geolocated offers are expected to be relatively robust. Again, however, applicants wish to emphasize that the present techniques provide a number of benefits that may be achieved independently and that not all embodiments necessarily provide all of these benefits.

Figure 4:
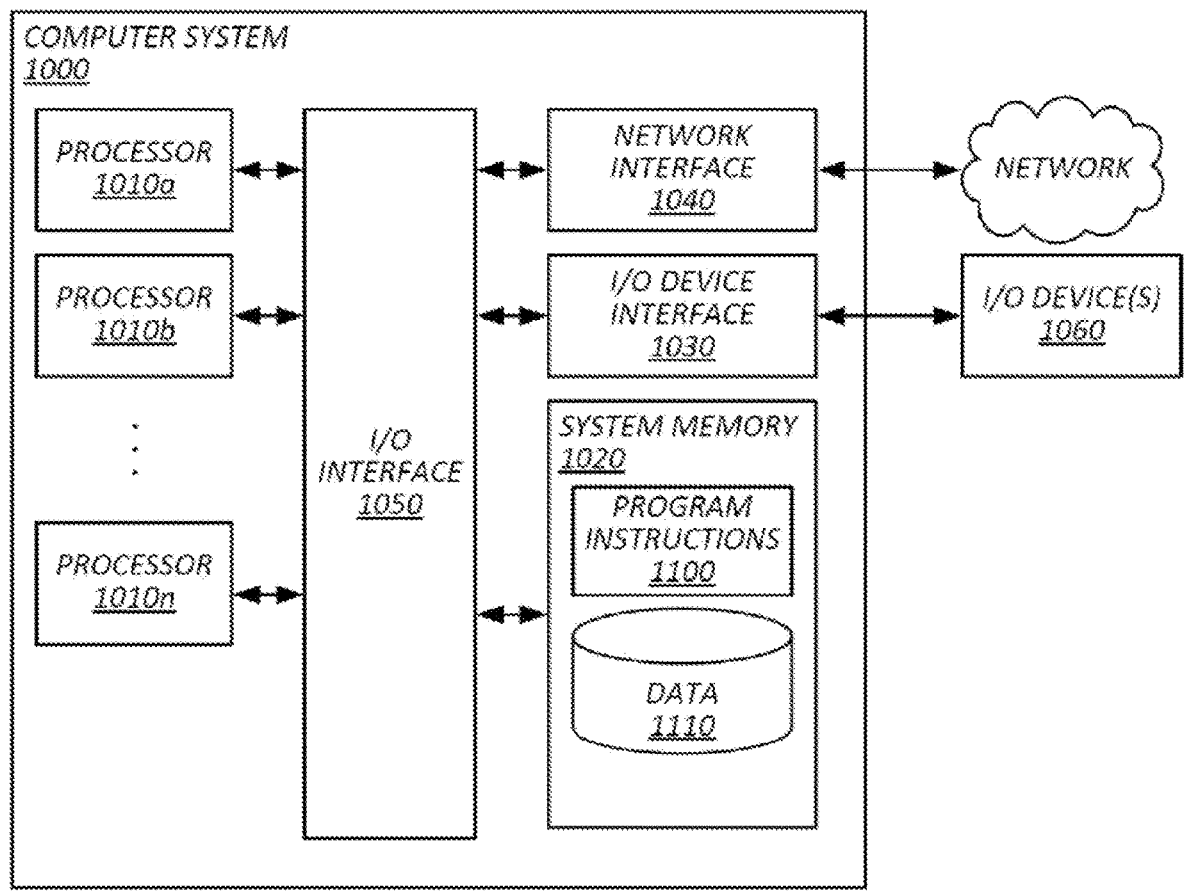
FIG. 4 shows an example of a computer system that may be used to implement some or all of the components described herein.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, solutions to many of these problems are described above.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

0. A method of programmatically administering a game of chance by interacting with a consumer mobile device to enter a consumer in the game of chance in exchange for the consumer moving from a mall to a store in the mall seeking consumer visits, the consumer mobile device presenting an alert describing the game of chance in response to detecting that the consumer is in a geofence corresponding to the mall, and the consumer mobile device causing the consumer to be entered in the game of chance in response to detecting that the consumer is within wireless range of a transmitter at the store, the method comprising: obtaining offers; sending the obtained offers to consumers with a computer.

1. The method of embodiment 0, comprising: obtaining data defining a multi-stage geolocated offer specifying one or more rewards to be conferred on consumers in exchange for the respective consumers moving from an alert geographic location to a reward geographic location, wherein the alert geographic location is specified by one or more geographic coordinates and is a geographic area smaller than 1,000 square kilometers that contains the reward geographic location, wherein the reward geographic location corresponds to at least a portion of a physical site of a merchant and is specified by an identifier that is encoded in a wireless transmission by a wireless transmitter at the physical site of the merchant, and wherein the one or more rewards include entry into a game of chance; sending a consumer mobile device the multi-stage geolocated offer and instructions to alert a consumer to the multi-stage geolocated offer in response to the consumer mobile device detecting that the consumer mobile device is within the alert geographic location; sending the consumer mobile device instructions to perform steps comprising:

detecting when the consumer mobile device wirelessly receives the identifier that is encoded in the wireless transmission by the wireless transmitter at the physical site of the merchant, and in response to detecting the identifier, sending an indication that the consumer is within the reward geographic location;

receiving an indication that the consumer is within the reward geographic location; determining, with a processor, based on the received indication that the consumer is within the reward geographic location, that the consumer qualifies for entry in the game of chance; and storing in memory data qualifying the consumer for the reward.

2. The method of any of embodiments 0-1, wherein: the alert geographic location corresponds to a boundary of a mall; the reward geographic location is a store in the mall; and alerting the consumer to the multi-stage offer comprises displaying a message on a display screen of the consumer mobile device indicating that the consumer will receive one or more of the one or more rewards in exchange for visiting the store.

2.1 The method of any of embodiments 0-1, wherein the alert geographic location is comprised of one or more geographic locations which encompass an entrance or exit of a mall.

3. The method of any of embodiments 0-2, wherein: the alert geographic location is defined by a geofence to which the consumer mobile device is instructed to compare geographic coordinates of the consumer mobile device obtained based on wireless signals received by the consumer mobile device, wherein the geofence includes an interior negative area in which consumers are not alerted to the multi-stage geofenced offer, and wherein the reward geographic location is in the interior negative area; and the identifier that is encoded in the wireless transmission by the wireless transmitter at the physical site of the merchant is a value encoded in a wireless beacon transmitting at the physical site of the merchant.

4. The method of any of embodiments 0-3, wherein after receiving an indication that the consumer is within the reward geographic location, sending the consumer mobile device an offer redeemable at the reward geographic location.

5. A method of managing offers, the method comprising: obtaining, via a network, with a consumer mobile device, data defining an offer available based on the consumer mobile device being in a first geographic location and redeemable based on the consumer mobile device later being in a second geographic location; sensing, with the consumer mobile device, that the consumer mobile device is in the first geographic location; in response to sensing that that the consumer mobile device is in the first geographic location, presenting an alert with the consumer mobile device, the alert indicating that the offer is available; sensing that the consumer mobile device is in the second geographic location; and in response to sensing that the consumer mobile device is in the second geographic location, determining with a processor of the consumer mobile device that the offer has been redeemed.

6. The method of embodiment 5, wherein: the offer comprises entry into a game of chance in exchange for the consumer mobile device detecting the presence of the consumer mobile device at the second geographic location, wherein the second geographic location corresponds to a store of a merchant.

7. The method of any of embodiments 5-6, wherein the first geographic location is specified by a geofence defined by one or more latitude and longitude coordinates.

8. The method of any of embodiments 5-7, wherein the second geographic location is specified by a value transmitted by a wireless beacon at the second geographic location.

9. The method of any of embodiments 5-8, wherein obtaining the data defining the offer comprises: sensing, with the consumer mobile device, a current geographic location of the consumer mobile device; requesting, with the consumer mobile device, offers specifying geographic locations including the current geographic location and offers specifying geographic locations near the current geographic location; receiving data defining a plurality of offers responsive to the request; and storing the data defining the plurality of offers in memory of the consumer mobile device.

10. The method of any of embodiments 5-9, comprising: after determining that the offer has been redeemed, receiving with the consumer mobile device, data defining another offer redeemable based on the consumer mobile device later being in a third geographic location.

11. The method of any of embodiments 5-10, comprising: after determining that the offer has been redeemed, incrementing a count of redemptions of the offer; determining that the count qualifies the consumer for a reward; and displaying an indication with the consumer mobile device that the consumer qualifies for the reward.

12. The method of any of embodiments 5-11, wherein sensing that the consumer mobile device is in the second geographic location comprises: detecting a wirelessly transmitted value at the second geographic location with the consumer mobile device; or detecting a wirelessly transmitted value transmitted from the consumer mobile device with a merchant computing device.

13. The method of any of embodiments 5-12, wherein presenting an alert with the consumer mobile device comprises sending a message from the consumer mobile device to a wearable computing device to present the alert.

14. The method of any of embodiments 5-13, wherein: the offer further requires that an amount of other consumers associated with a user of the consumer mobile device by a social graph be in the second geographic location to redeem the offer; and determining that the offer has been redeemed comprises determining that the amount of other consumers associated with the user of the consumer mobile device by the social graph are at the second geographic location.

15. A system, comprising: one or more processors; memory storing instructions that when executed by at least some of the one or more processors effectuate operations comprising:

obtaining data defining a multi-stage geolocated offer; sending the multi-stage geolocated offer to a consumer mobile device, the consumers mobile device executing an offers application, the multi-stage geolocated offer being configured to cause the offers application to present an alert with the consumer mobile device after the consumer mobile device is in a first geographic location, the multi-stage geolocated offer being redeemable based on the consumer mobile device being in a second geographic location; receiving an indication that the consumer mobile device is in the second geographic location; and in response to the indication that the consumer mobile device is in the second geographic location, determining, with a processor, that the multi-stage geolocated offer has been redeemed.

16. The system of embodiment 15, wherein: obtaining data defining a multi-stage geolocated offer comprises obtaining data defining a plurality of multi-stage geolocated offers from a plurality of merchants, wherein the data is obtained by a publisher in an affiliate network.

17. The system of any of embodiments 15-16, wherein: the indication that the consumer mobile device is in the second geographic location is received from the consumer mobile device; and the second geographic location is defined based on the range of a wireless transmitter at the second geographic location.

18. The system of any of embodiments 15-17, wherein the second geographic location is inside a negative space of the first geographic location such that the second geographic location does not overlap the first geographic location.

19. The system of any of embodiments 15-18, wherein sending the multi-stage geolocated offer to a consumer mobile device comprises: receiving a request for geolocated offers in a third geographic location containing a current geographic location of the consumer mobile device; and sending a plurality of geolocated offers to the consumer mobile device, the plurality of geolocated offers including the multi-stage geolocated offer and other offers in the third geographic location.

20. The system of any of embodiments 15-19, wherein: the first geographic location is defined by a geofence specified by geographic coordinates; the second geographic location is defined by a range of one or more wireless beacons; and redeeming the offer comprises entering a consumer in game of chance.

21. A tangible, non-transitory, machine-readable medium storing instructions that when executed by a data processing apparatus cause the data processing apparatus to perform operations comprising: the steps of any of embodiments 0-20.

22. A system, comprising: one or more processors; and memory storing instructions that when executed by the processors cause the processors to effectuate operations comprising: the steps of any of embodiments 0-14.

23. A method comprising: performing the steps of any of embodiments 15-20.

What is claimed is:

1. A non-transitory, machine-readable medium storing instructions that when executed by one or more processors effectuate operations comprising:
    obtaining, with a computer system, program data specified by a multi-stage geolocated program record;
    sending, with the computer system, the program data specified by the multi-stage geolocated program record to a mobile computing device, the mobile computing device executing a first application based on the program data, wherein:
        the program data is configured to cause the first application to present an alert with the mobile computing device after the mobile computing device is in a first geographic location,
        the alert is presented in response to a determination that a set of profile values comprising interaction records associated with the multi-stage geolocated program record satisfy a first qualification criterion of the multi-stage geolocated program record,
        the set of profile values is accessed via a prefix tree, the prefix tree being a pre-processed data structure configured to expedite retrieval of the set of profile values from a data repository,
        the interaction records describe previous interactions of a user identified by the set of profile values, and
        the program data is configured to cause an update of a sequence of geographic locations visited by the mobile computing device to indicate that the mobile computing device has visited a second geographic location of the sequence of geographic locations after the first geographic location is visited;
    receiving, with the computer system, an indication that the mobile computing device is in the second geographic location;
    in response to the indication that the mobile computing device is in the second geographic location, determining, with the computer system, by accessing at least some of the set of profile values via the prefix tree, that the set of profile values satisfy a second qualification criterion of the multi-stage geolocated program record; and
    in response to the determination that the set of profile values satisfied the second qualification criterion, sending, with the computer system, a second alert to the mobile computing device.

2. The medium of claim 1, wherein:
    obtaining the program data specified by the multi-stage geolocated program record comprises obtaining data associated with a plurality of multi-stage geolocated program records from a plurality of entities;
    the indication that the mobile computing device is in the second geographic location is received from the mobile computing device; and
    the second geographic location is defined based on a range of a wireless transmitter at the second geographic location.

3. The medium of claim 1, wherein the second geographic location is inside a negative space of the first geographic location such that the second geographic location does not overlap the first geographic location.

4. The medium of claim 1, wherein the multi-stage geolocated program record is a first multi-stage geolocated program record, and wherein sending the program data specified by the first multi-stage geolocated program record to the mobile computing device comprises:
    receiving a request based on a third geographic location containing a current geographic location of the mobile computing device; and
    sending a set of program data associated with a plurality of multi-stage geolocated program records to the mobile computing device, wherein the plurality of multi-stage geolocated program records comprises the first multi-stage geolocated program record and a second multi-stage geolocated program record associated with the third geographic location.

5. The medium of claim 1, the operations further comprising:
    obtaining a message from the mobile computing device, wherein the message comprises a device geolocation and an identifier, wherein the device geolocation is determined based on a satellite navigation signal;
    determining whether the mobile computing device has been in the first geographic location based on the geolocation and a geofence, wherein the first geographic location comprises the geofence;
    in response to a determination that the mobile computing device has been in the first geographic location, updating the sequence of geographic locations to comprise the first geographic location, wherein the sequence of geographic locations is associated with the identifier;
    determining whether the mobile computing device is in the second geographic location based on the mobile computing device being within range of a wireless beacon in the second geographic location, wherein the second geographic location is an indoor location;
    in response to a determination that the mobile computing device that the mobile computing device has been in the second geographic location, updating the sequence of geographic locations to comprise the second geographical location;
    in response to a determination that the mobile computing device has been in the first geographic location and in the second geographic location based on the sequence of geographic locations, storing a set of updates in a buffer, wherein the set of updates comprises a universal resource identifier (URI);
    sending the set of updates to the mobile computing device by accessing the buffer;
    retrieving visual data encoding a code based on the URI;
    determining whether the set of profile values satisfy the qualification criterion based on the code; and
    updating a value associated with the multi-stage geolocated program record to indicate that the set of profile values satisfy the qualification criterion.

6. The medium of claim 1, wherein the program data is a first program data, and wherein the first application further causes the mobile computing device to:
    obtain a device geolocation of the mobile computing device;
    determine whether the device geolocation is within a proximity range of a third geographic location associated with a second program data, wherein the second program data is specified by a second multi-stage geolocated program record;
    obtaining the second program data; and storing the first program data and the second program data within a cache memory of the mobile computing device.

7. The medium of claim 6, wherein the first application causes the mobile computing device to:
determine that the mobile computing device lacks adequate signal strength to communicate via a wireless signal;
recall the second program data from the cache memory in response to a determination that the mobile computing device lacks adequate signal strength; and
execute the first application based on the second program data.

8. The medium of claim 1, wherein the operations further comprise:
based on a determination that the set of profile values associated with the sequence of geographic locations has satisfied the qualification criterion of the multi-stage geolocated program record, sending the mobile computing device a validation value encoded in a visual code;
obtain an indication that the visual code has been scanned from a scanning device, wherein the indication comprises the validation value; and
determine whether the validation value satisfies a validation criterion based on whether the validation value had been used.

9. The medium of claim 1, wherein the operations further comprise:
updating a profile record of a profile repository to indicate that the mobile computing device has been detected in the second geographic location, wherein the profile record is associated with the sequence of geographic locations;
wherein determining that the set of profile values associated with the multi-stage geolocated program record has been updated comprises determining whether the profile record indicates that the qualification criterion is satisfied; and
in response to a determination that the profile record indicates that the qualification criterion is satisfied, updating a value associated with the multi-stage geolocated program record to based on the profile record.

10. The medium of claim 1, the operations further comprising:
obtaining a program state value stored on the mobile computing device;
determining whether the mobile computing device was in the first geographic location based on the program state value, wherein a location indicated as a current location of the mobile computing device is not in the first geographic location; and
in response to a determination that the mobile computing device was in the first geographic location based on the program state value, determining whether the set of profile values associated with the sequence of geographic locations satisfies the qualification criterion.

11. The medium of claim 1, wherein the first application further causes the mobile computing device to:
receive a first wireless signal via a near field communication transmission, wherein a source of the near field communication transmission is less than 1 meter from the mobile computing device;
determine that the mobile computing device is in the second geographic location based on the first wireless signal; and
send the indication that the mobile computing device is in the second geographic location using a cellular interface or wi-fi interface via a second wireless signal, wherein the receiver of the second wireless signal is greater than 1 meter away from the mobile computing device.

12. The medium of claim 1, wherein:
the program data specified by the multi-stage geolocated program record comprises a message and a reference to data encoding visual information;
the data encoding the visual information is hosted on a load-balancing server;
the first application based on the program data specified by the multi-stage geolocated program record causes the mobile computing device to:
obtain the visual information from the load-balancing server based on the reference to data encoding visual information; and
display the message with the visual information with the mobile computing device.

13. The medium of claim 1, wherein:
the program data specified by the multi-stage geolocated program record causes the set of profile values to be associated with the program data in response a geolocation associated with the set of profile values being detected in the first geographic location;
the first geographic location is specified by a geofence defined with one or more geographic coordinates and is a geographic area smaller than 1,000 square kilometers that contains the second geographic location;
the second geographic location corresponds to at least a portion of a physical site specified by a location identifier that is encoded in a wireless transmission by a wireless transmitter at the physical site;
association of the set of profile values with the program data comprises performing a random or pseudorandom operation based on a profile record associated with the set of profile values;
the first application based on the program data causes the mobile computing device to:
detect when the mobile computing device wirelessly receives the location identifier that is encoded in the wireless transmission by the wireless transmitter at the physical site, and
in response to detecting the location identifier, sending an indication that the geolocation associated with the set of profile values is within the first geographic location.

14. The medium of claim 13, the operations further comprising:
determining a plurality of profile records, wherein each respective record of the plurality of profile records is associated with a respective sequence of geographic locations comprising the second geographic location, and wherein the respective record comprises a respective identifier; and
wherein performing the random or pseudorandom operation comprises selecting a identifier of the plurality of profile records based on a value obtained using a random number generator.

15. The medium of claim 1, wherein causing the mobile computing device to present an alert with the mobile computing device comprises causing the mobile computing device to send a message from the mobile computing device to a wearable computing device.

16. The medium of claim 1, wherein the indication that the mobile computing device is in the second geographic location is determined based on a value sent from the mobile computing device to a second computing device, and wherein the second computing device is in the second geographic location.

17. The medium of claim 1, the operations further comprising:
 steps for caching content;
 steps for reducing latency; and
 steps for reducing battery consumption.

\* \* \* \* \*